United States Patent
Ryoo

(10) Patent No.: US 8,446,138 B2
(45) Date of Patent: May 21, 2013

(54) STABILITY COMPENSATION CIRCUIT AND DC-DC CONVERTER INCLUDING THE SAME

(75) Inventor: Ji Yeoul Ryoo, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 751 days.

(21) Appl. No.: 12/584,102

(22) Filed: Aug. 31, 2009

(65) Prior Publication Data

US 2010/0052640 A1    Mar. 4, 2010

(30) Foreign Application Priority Data

Sep. 2, 2008    (KR) .................. 10-2008-0086262

(51) Int. Cl.
    *G05F 1/00*    (2006.01)
(52) U.S. Cl.
    USPC .......................................... 323/288
(58) Field of Classification Search
    USPC ................ 323/222, 282, 283, 288, 299–301
    See application file for complete search history.

(56) References Cited

U.S. PATENT DOCUMENTS

| 5,483,687 | A | * | 1/1996 | Barrett et al. | 455/183.2 |
| 6,768,658 | B2 | * | 7/2004 | Perry | 363/65 |
| 7,466,116 | B2 | * | 12/2008 | Sato et al. | 323/285 |
| 7,589,507 | B2 | * | 9/2009 | Mandal | 323/273 |
| 7,663,352 | B2 | * | 2/2010 | Yang et al. | 323/271 |
| 8,022,680 | B2 | * | 9/2011 | Ryoo | 323/282 |
| 2011/0199062 | A1 | * | 8/2011 | Singnurkar | 323/282 |

FOREIGN PATENT DOCUMENTS

| JP | 5-63505 | 3/1993 |
| JP | 5-259808 | 10/1993 |
| JP | 6-310980 | 11/1994 |
| JP | 6-338759 | 12/1994 |

\* cited by examiner

*Primary Examiner* — Adolf Berhane
*Assistant Examiner* — Yemane Mehari
(74) *Attorney, Agent, or Firm* — Onello & Mello, LLP

(57) ABSTRACT

A stability compensation circuit and a DC-DC converter including the same are provided. When an output voltage of the DC-DC converter decreases more than a predetermined value, the stability compensation circuit quickly charges an integral capacitor by using an additional converter or by reducing an effective resistance of a charging circuit which charges the capacitor. Since an output voltage of an integrator in the stability compensation circuit is enabled to quickly reach a control voltage, the instant decrease of the output voltage of the DC-DC converter can be quickly compensated for.

9 Claims, 6 Drawing Sheets

STABILITY COMPENSATION CIRCUIT AND DC-DC CONVERTER INCLUDING THE SAME

RELATED APPLICATION

This application claims priority under 35 U.S.C. 119 to Korean Patent Application No. 10-2008-0086262, filed on Sep. 2, 2008, in the Korean Intellectual Property Office, the entire contents of which are incorporated herein by reference.

BACKGROUND

The present invention relates to a stability compensation circuit and a DC-DC converter including the same.

When a load on an output of a DC-DC converter changes from a light load to a heavy load in an instant, an output voltage of the DC-DC converter abruptly decreases and then slowly returns to an original level. This is because a certain period of time is needed to charge an integral capacitor of a stability compensation circuit included in the DC-DC converter with a predetermined control voltage.

If a large amount of time elapses until the output voltage of the DC-DC converter returns to the original level since, the stability of the DC-DC converter may be adversely affected and an error may result. Accordingly, to maintain a desired output voltage with the least influence of changing load, it is necessary to control the output voltage of an integrator in a stability compensation circuit to reach a control voltage as quickly as possible.

SUMMARY

Some embodiments of the present invention provide a stability compensation circuit for controlling an output voltage of an integrator to reach a control voltage as quickly as possible and a DC-DC converter including the same.

According to some embodiments of the present invention, there is provided a stability compensation circuit including a first converter configured to generate a first current corresponding to a voltage difference between an input voltage and a reference voltage, a second converter configured to generate a second current corresponding to the voltage difference when the voltage difference exceeds a predetermined value, and a charging circuit configured to receive the first current and the second current and increase an internal charge voltage.

The charging circuit may include a resistor and a capacitor, the first current may be supplied to the capacitor via the resistor, and the second current may be directly supplied to the capacitor.

According to other embodiments of the present invention, there is provided a stability compensation circuit including a first converter configured to generate a current corresponding to a voltage difference between an input voltage and a reference voltage; an integration circuit configured to output an integration voltage based on the voltage difference; and a sensing circuit configured to sense a voltage difference between an output voltage of the integration circuit and an output voltage of the first converter, generate a control signal for controlling the voltage difference between the output voltage of the integration circuit and the output voltage of the first converter, and output the control signal to the integration circuit.

The stability compensation circuit may further include a second converter configured to generate a current corresponding to a voltage difference between the output voltage of the integration circuit and the reference voltage. The integration circuit may include an integrator configured to generate the output voltage of the integration circuit and a resistance circuit configured to control current supplied to the integrator by controlling a resistance value in response to the control signal.

The integration circuit may further include a switch which is turned on or off in response to the control signal output from the sensing circuit and control the resistance value by turning on or off the switch in response to the control signal.

The sensing circuit may include a sense resistor configured to measure the voltage difference between the output voltage of the integration circuit and the output voltage of the first converter and a comparator configured to compare the voltage difference measured by the sense resistor with a predetermined value and output the control signal based on a result of the comparison. The comparator may outputs the control signal when the voltage difference measured by the sense resistor exceeds the predetermined value.

According to further embodiments of the present invention, there is provided a DC-DC converter including a ramp generator configured to output a ramp signal; a stability compensation circuit configured to receive at least part of an output voltage of the DC-DC converter as a feedback voltage and perform stability compensation based on the feedback voltage and a reference voltage; a comparator configured to compare a control voltage of the stability compensation circuit with the ramp signal output from the ramp generator, determine a pulse width based on a result of the comparison, and output a signal having the pulse width; and a main switch operating circuit configured to receive the signal from the comparator and drive at least one switch among a plurality of main switches which control transmission of the signal. The stability compensation circuit includes a first converter configured to generate a first current corresponding to a voltage difference between the feedback voltage and the reference voltage, a second converter configured to generate a second current corresponding to the voltage difference when the voltage difference exceeds a predetermined value, and a charging circuit configured to receive the first current and the second current and increase an internal charge voltage.

In other embodiments, a DC-DC converter includes a ramp generator configured to output a ramp signal; a stability compensation circuit configured to receive at least part of an output voltage of the DC-DC converter as a feedback voltage and perform stability compensation based on the feedback voltage and a reference voltage; a comparator configured to compare a control voltage of the stability compensation circuit with the ramp signal output from the ramp generator, determine a pulse width based on a result of the comparison, and output a signal having the pulse width; and a main switch operating circuit configured to receive the signal from the comparator and drive at least one switch among a plurality of main switches which control transmission of the signal. The stability compensation circuit includes a converter configured to generate a current corresponding to a voltage difference between the feedback voltage and the reference voltage; an integration circuit configured to output an integration voltage based on the voltage difference; and a sensing circuit configured to sense a voltage difference between an output voltage of the integration circuit and an output voltage of the converter, generate a control signal for controlling the voltage difference between the output voltage of the integration circuit and the output voltage of the converter, and output the control signal to the integration circuit.

BRIEF DESCRIPTION OF THE DRAWINGS

The foregoing and other features and advantages of the invention will be apparent from the more particular descrip

DETAILED DESCRIPTION OF THE EMBODIMENTS

Figure 1:
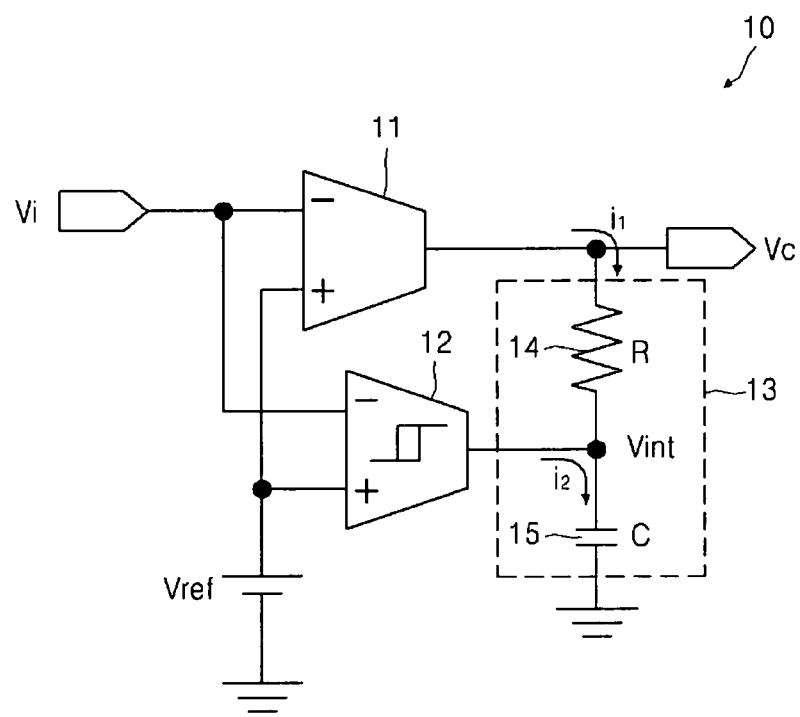
- FIG. 1 is a block diagram of a stability compensation circuit according to some embodiments of the present invention.

This application claims priority under 35 U.S.C. 119 to Korean Patent Application No. 10-2008-0086262, filed on Sep. 2, 2008, in the Korean Intellectual Property Office, the entire contents of which are incorporated herein by reference.

The present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this description will be thorough and complete, and will fully convey the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the description.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a stability compensation circuit 10 according to some embodiments of the present invention. The stability compensation circuit 10 may include a first converter 11 generating a first current $i_1$ corresponding to a voltage difference between an input voltage $V_i$ and a reference voltage $V_{ref}$ and a second converter 12 generating a second current $i_2$ corresponding to a voltage difference between the input voltage $V_i$ and the reference voltage $V_{ref}$ when the voltage difference is greater than a threshold voltage $V_{th}$. The stability compensation circuit 10 may be a loop filter.

When a load on an output terminal of a DC-DC converter including the stability compensation circuit 10 rapidly increases in an instant, a control voltage $V_C$ for controlling a charge voltage $V_{int}$ of a capacitor C increases and the stability compensation circuit 10 enables the charge voltage $V_{int}$ of the capacitor C to reach the increased control voltage $V_C$ as quickly as possible. That is, the input voltage $V_i$ and the reference voltage $V_{ref}$ have substantially the same value in a steady state, but when a load on the output terminal of the DC-DC converter abruptly increases, the input voltage $V_i$ decreases abruptly. In this case, it is required to quickly compensate for the voltage difference between the input voltage $V_i$ and the reference voltage $V_{ref}$.

The first converter 11 or the second converter 12 includes any type of circuit or device which receives differential input signals and outputs a signal corresponding to a difference between the differential input signals, for example, an operational transconductance amplifier (OTA), a transconductor, an error amplifier, or a voltage-to-current converter. The first converter 11 performs conversion every time when there is a voltage difference between the input voltage $V_i$ and the reference voltage $V_{ref}$ while the second converter 12 performs conversion only when the voltage difference between the input voltage $V_i$ and the reference voltage $V_{ref}$ is greater than a predetermined value. The second converter 12 may perform the conversion using hysteresis.

Referring to FIG. 1, the input voltage $V_i$ is applied to a first input terminal of each of the first and second converters 11 and 12 and the reference voltage $V_{ref}$ is applied to a second input terminal of each of the first and second converters 11 and 12. The input voltage $V_i$ is one of values generated by dividing an output voltage $V_O$ (in FIG. 4) of the DC-DC converter using a plurality of resistors. Accordingly, the input voltage $V_i$ is a feedback voltage having the characteristics of the output voltage $V_O$ of the DC-DC converter, and therefore, the change in the output voltage $V_O$ of the DC-DC converter can be easily observed by observing the change in the input voltage $V_i$.

The first converter 11 may compare the input voltage $V_i$ with the reference voltage $V_{ref}$ and, when there is a voltage difference between the input voltage $V_i$ and the reference voltage $V_{ref}$, may generate and output the first current $i_1$ corresponding to the voltage difference. The second converter 12 may compare the input voltage $V_i$ with the reference voltage $V_{ref}$ and, when a voltage difference between the input voltage $V_i$ and the reference voltage $V_{ref}$ exceeds a predetermined value, may generate and output the second current $i_2$ corresponding to the voltage difference. Accordingly, when the voltage difference between the input voltage $V_i$ and the reference voltage $V_{ref}$ does not exceed the predetermined value, only the first converter 11 may operate. When the voltage difference between the input voltage $V_i$ and the reference voltage $V_{ref}$ exceeds the predetermined value, both of the first and second converters 11 and 12 may operate.

The stability compensation circuit 10 may also include a charging circuit 13 which receives at least one of the first current $i_1$ and the second current $i_2$ and increases an internal charge voltage. In addition, the charging circuit 13 may be implemented to generate a zero or a pole for the stability compensation of a system including the stability compensation circuit 10.

The charging circuit 13 may include a resistor 14 and a capacitor 15 connected with the resistor 14. The resistor 14 and the capacitor 15 may be connected in series with each other. An output terminal of the second converter 12 may be connected with a common node between the resistor 14 and the capacitor 15 and an output terminal of the first converter 11 may be connected with another end of the resistor 14. Accordingly, the first current $i_1$ from the first converter 11 is supplied to the capacitor 15 via the resistor 14 and the second current $i_2$ from the second converter 12 is directly supplied to the capacitor 15. As a result, when the output voltage $V_O$ of the DC-DC converter abruptly decreases more than a predetermined value, the charge voltage $V_{int}$ of the capacitor 15 is enabled to quickly reach the control voltage $V_C$ by using both the first converter 11 and the second converter 12.

Figure 2A:
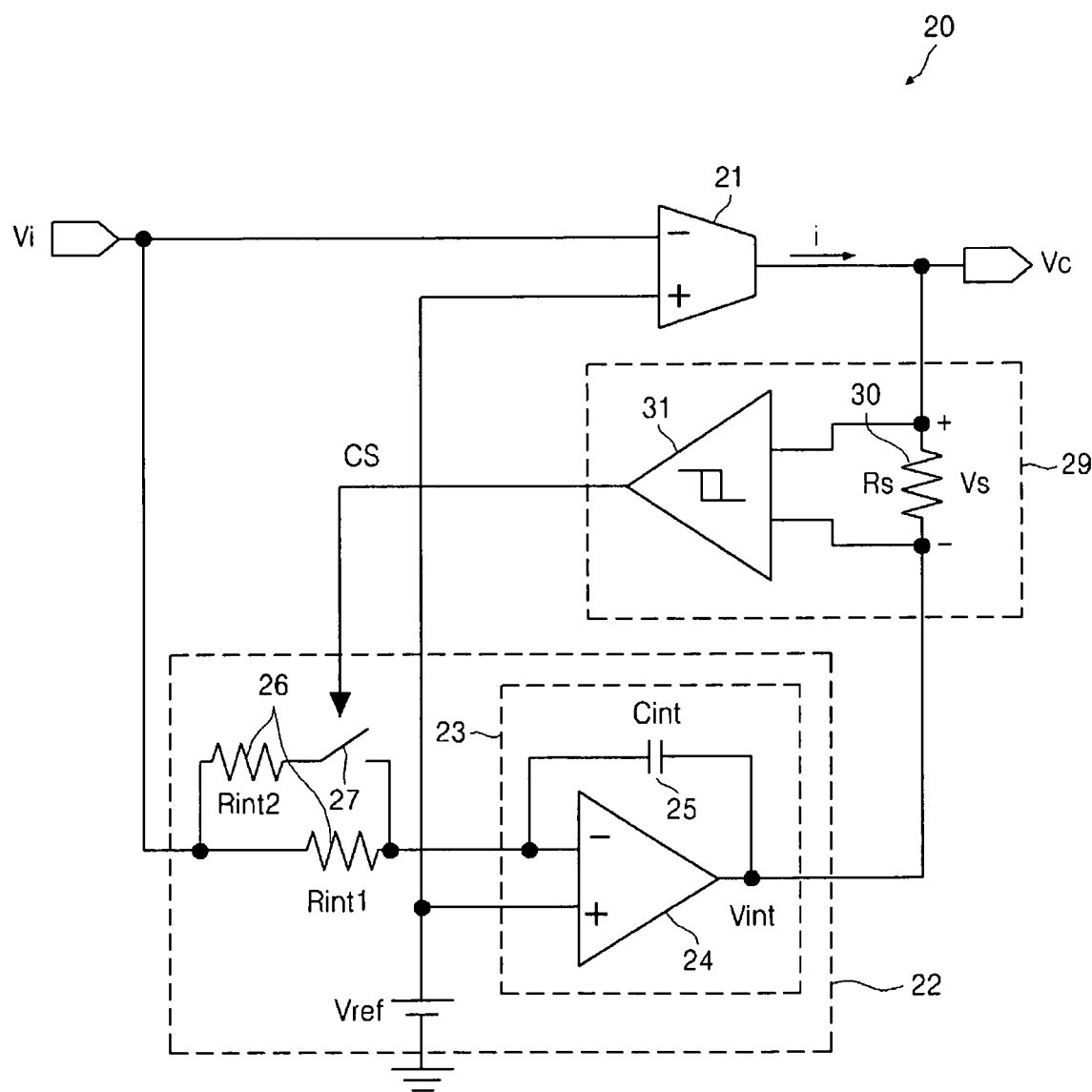
FIG. 2A is a block diagram of a stability compensation circuit according to other embodiments of the present invention.
Figure 2B:
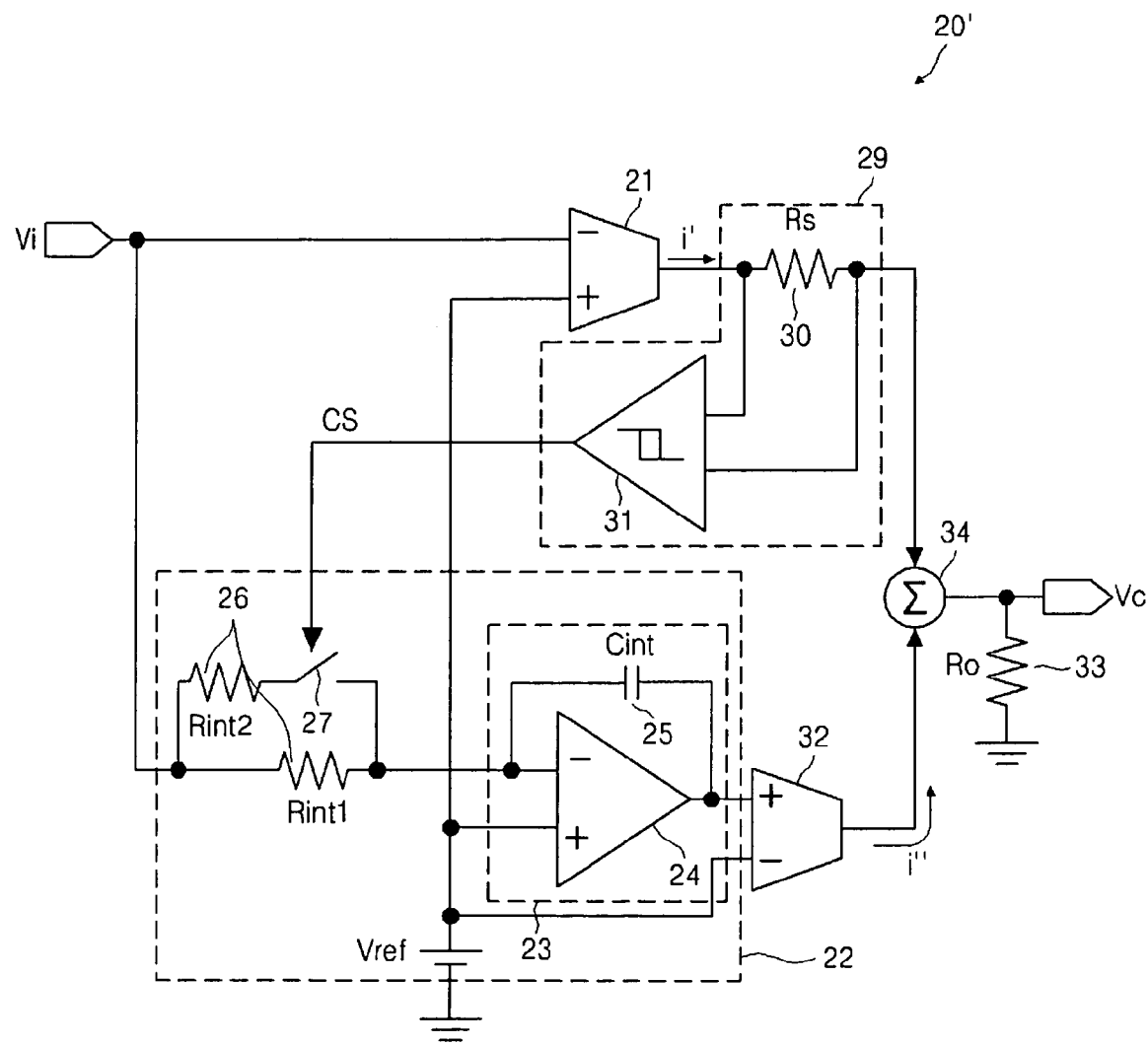
FIG. 2B is a block diagram of a stability compensation circuit according to further embodiments of the present invention.

FIG. 2A is a block diagram of a stability compensation circuit 20 based on a voltage mode, according to other embodiments of the present invention. FIG. 2B is a block diagram of a stability compensation circuit 20' based on a current mode, according to further embodiments of the present invention. When a load on an output terminal of a DC-DC converter including the stability compensation circuit 20 or 20' rapidly increases in a short time, the control voltage $V_C$ for controlling an output voltage $V_{int}$ of an integration circuit 22 increases, the stability compensation circuit 20 or 20' enables the output voltage $V_{int}$ of the integration circuit 22 to reach the increased control voltage $V_C$ as quickly as possible.

Referring to FIG. 2A, the stability compensation circuit 20 may include a first converter 21, the integration circuit 22, and a sensing circuit 29. The first converter 21 may generate a current "i" corresponding to a voltage difference between an input voltage $V_i$ and a reference voltage $V_{ref}$. The integration circuit 22 may output the integration voltage or the charge voltage $V_{int}$ based on the voltage difference between the input voltage $V_i$ and the reference voltage $V_{ref}$.

The sensing circuit 29 may sense a voltage difference between the output voltage $V_{int}$ of the integration circuit 22 and the output voltage $V_C$ of the first converter 21, generate a control signal CS for controlling the voltage difference between the output voltage $V_{int}$ of the integration circuit 22 and the output voltage $V_C$ of the first converter 21, and output the control signal CS to the integration circuit 22. The sensing circuit 29 may include a sense resistor 30 which measures a voltage difference $V_S$ between the output voltage $V_{int}$ of the integration circuit 22 and the output voltage $V_C$ of the first converter 21, and a comparator 31 which compares the voltage difference $V_S$ measured by the sense resistor 30 with a predetermined value and outputs the control signal CS based on the comparison result. The comparator 31 may have a hysteresis characteristic.

As described above, the input voltage $V_i$ is one of the values generated by dividing the output voltage $V_O$ (in FIG. 4) of the DC-DC converter using a plurality of resistors. Accordingly, the input voltage $V_i$ is a feedback voltage having the characteristics of the output voltage $V_O$ of the DC-DC converter, and therefore, the change in the output voltage $V_O$ of the DC-DC converter can be easily observed by observing the change in the input voltage $V_i$. When the load of the DC-DC converter increases in an instant, the first converter 21 outputs the current "i" corresponding to the voltage difference between the input voltage $V_i$ and the reference voltage $V_{ref}$ and the control voltage $V_C$ increases in response to the current "i". The output voltage $V_{int}$ of the integration circuit 22 is directly connected with a capacitor $C_{int}$ and is thus not influenced by the instant voltage change and the voltage $V_S$ ($=V_C-V_{int}$) corresponding to an increment of the control voltage $V_C$ applied to both ends of the sense resistor ($R_S$) 30. That is, the sense resistor 30 can measure the voltage difference between the output voltage $V_{int}$ of the integration circuit 22 and the control voltage $V_C$, thereby sensing the instant decrease of the output voltage $V_O$ of the DC-DC converter.

The integration circuit 22 may include an integrator 23 generating the charge voltage $V_{int}$, a resistance circuit 26 generating a current supplied to the integrator 23, and at least one switch 27 connected with at least part of the resistance circuit 26. The integrator 23 may include an operational amplifier 24 and a capacitor 25 connected between one (e.g., a negative (−) one) of input terminals of the operational amplifier 24 and an output terminal of the operational amplifier 24.

According to the current embodiments of the present invention, the stability compensation circuit 20 may measure the voltage difference between the output voltage $V_{int}$ of the integration circuit 22 and the control voltage $V_C$ using the sense resistor 30 and compare the voltage $V_S$ measured by the sense resistor 30 with the predetermined value using the comparator 31. When the comparison result is that the voltage $V_S$ measured by the sense resistor 30 does not exceed the predetermined value, the comparator 31 may output the control signal CS at a first level (e.g., a low level) and the switch 27 may be open in response to the control signal CS from the comparator 31. When the comparison result is that the voltage $V_S$ measured by the sense resistor 30 exceeds the predetermined value, the comparator 31 may output the control signal CS at a second level (e.g., a high level) and the switch 27 may be closed in response to the control signal CS from the comparator 31. Consequently, when the voltage $V_S$ measured by the sense resistor 30, i.e., the voltage difference between the output voltage $V_{int}$ of the integration circuit 22 and the control voltage $V_C$ exceeds the predetermined value, current for charging the capacitor 25 in the integration circuit 22 may be increased by turning on the switch 27.

The resistance circuit 26 may be any type of circuit including a plurality of resistors connected in parallel and/or series with each other. For clarity of the description, an example in which two resistors $R_{int}1$ and $R_{int}2$ are connected in parallel is illustrated in FIGS. 2A and 2B.

In FIG. 2A, when the switch 27 is turned off, an equivalent resistor generating a current for charging the capacitor 25 is the resistor $R_{int}1$. When the switch 27 is turned on, the equivalent resistor generating the current for charging the capacitor 25 is a parallel connection of the first and second resistors $R_{int}1$ and $R_{int}2$, that is, $R_{int}1*R_{int}2/(R_{int}1+R_{int}2)$. Accordingly, when a decrement of the output voltage $V_O$ of the DC-DC converter exceeds a predetermined value, a time constant ($\tau$=RC) during the charge of the integration circuit 22 may be decreased by decreasing the equivalent resistance of the integration circuit 22, and therefore, the charging speed of the capacitor 25 may be increased.

The stability compensation circuit 20' illustrated in FIG. 2B includes a second converter 32 and the same elements as those included in the stability compensation circuit 20 illustrated in FIG. 2A. The detailed descriptions of like elements will not be repeated here. The second converter 32 generates a current "i'''" corresponding to a voltage difference between the output voltage $V_{int}$ of the integration circuit 22 and the reference voltage $V_{ref}$. The stability compensation circuit 20' may also include an adder 34 which adds a current "i'" output from the first converter 21 and the current "i'''" output from the second converter 32 and an output resistor 33 which converts a current "i'+i'''" output from the adder 34 into voltage information.

Figure 3A:
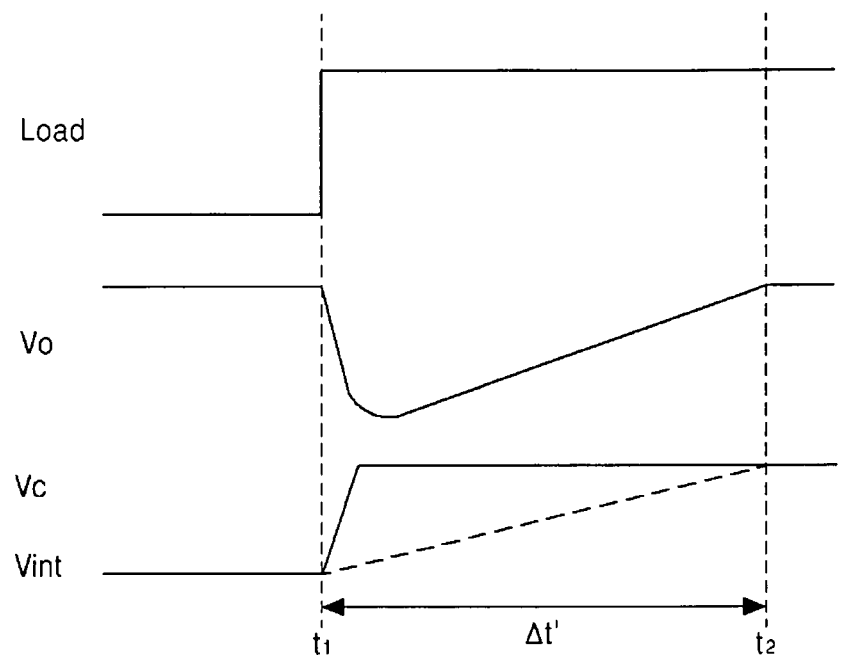
FIG. 3A is a graph showing the change in an output voltage and the change in a capacitor charge voltage when a load increases in an instant in a conventional DC-DC converter.
Figure 3B:
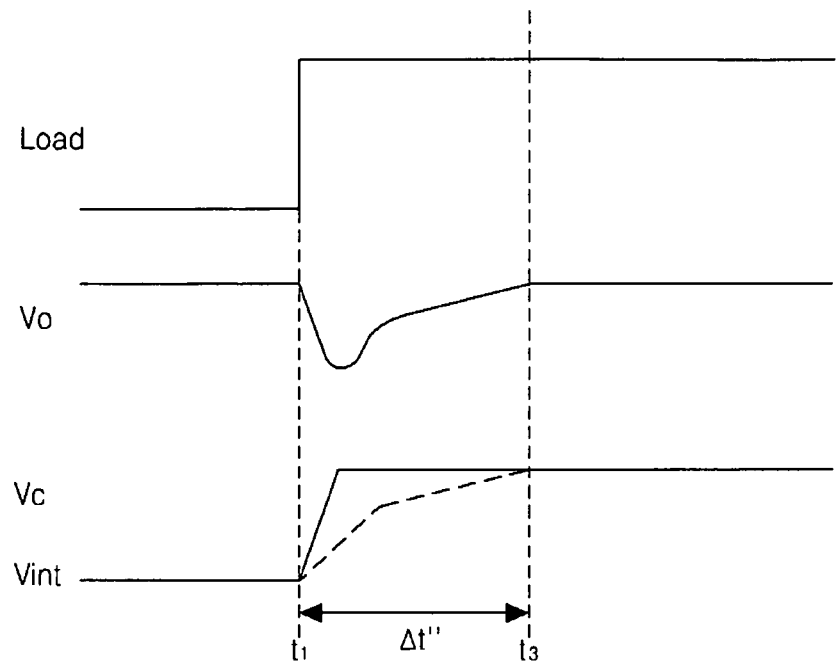
FIG. 3B is a graph showing the change in an output voltage of a DC-DC converter and the change in a capacitor charge voltage when a load increases in an instant in some embodiments of the present invention.

FIG. 3A is a graph showing the change in an output voltage $V_O$ and the change in a capacitor charge voltage $V_{int}$ when a load increases in an instant in a conventional DC-DC converter. FIG. 3B is a graph showing the change in an output voltage $V_O$ of a DC-DC converter and the change in a capacitor charge voltage $V_{int}$ when a load increases in an instant in some embodiments of the present invention.

Referring to FIG. 3A, when a load increases in an instant at a time $t_1$, the output voltage $V_O$ of the DC-DC converter decreases and returns to an original value after a predetermined period $\Delta t'$. At this time, as described above, since a predetermined period of time is required to charge a capacitor in a conventional stability compensation circuit, it takes the period $\Delta t'$ ($=t_2-t_1$) for the capacitor charge voltage $V_{int}$ to reach a control voltage $V_C$. Referring to FIG. 3B, however, a capacitor charging speed increases when the stability compensation circuit 10, 20, or 20' is used, and therefore, a period $\Delta t''$ taken for the output voltage $V_O$ of the DC-DC converter to return to an original value can be considerably reduced.

Figure 4:
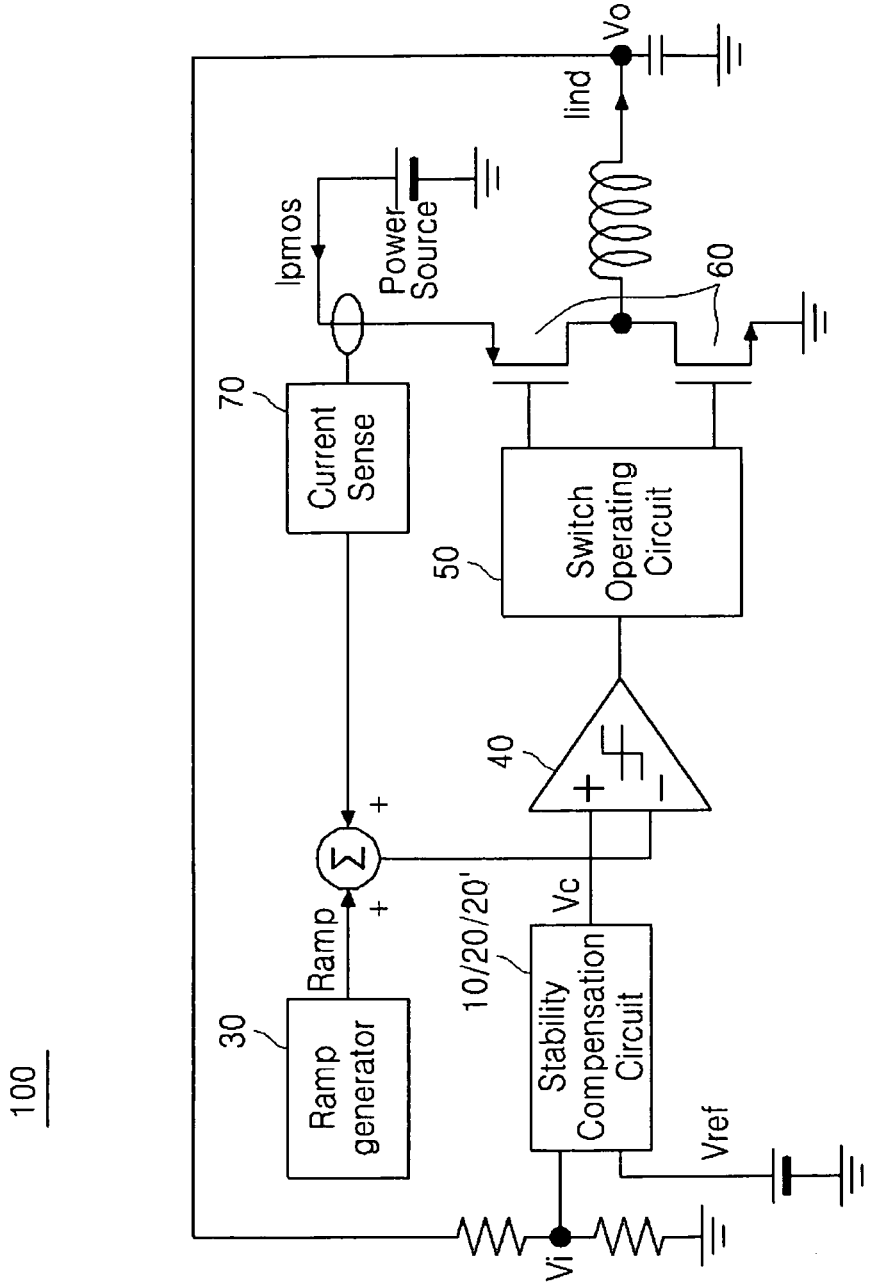
FIG. 4 is a block diagram of a DC-DC converter according to some embodiments of the present invention.

FIG. 4 is a block diagram of a DC-DC converter 100 according to some embodiments of the present invention. The DC-DC converter 100 may include a ramp generator 30, the stability compensation circuit 10, 20, or 20' according to the invention, a comparator 40, and a main switch operating circuit 50. The ramp generator 30 may generate and output a ramp signal which may be a sawtooth wave. When the DC-DC converter 100 is a current mode converter, the DC-DC converter 100 may also include a current sensor 70 which senses and outputs a current flowing in a main switch 60. When the DC-DC converter 100 is a voltage mode converter, the DC-DC converter 100 may not include the current sensor 70. The ramp signal output from the ramp generator 30 and a signal output from the current sensor 70 may be added by an adder and an added signal from the adder may be input to one of input terminals of the comparator 40.

The stability compensation circuit 10, 20, or 20' receives at least part of an output voltage $V_O$ of the DC-DC converter 100 as a feedback voltage $V_i$ and performs stability compensation based on the feedback voltage $V_i$ and the reference voltage $V_{ref}$. The comparator 40 may compare the control voltage $V_C$ from the stability compensation circuit 10, 20, or 20' with the signal output from the adder, determine a pulse width based on the comparison result, and output a signal with the pulse width. The main switch operating circuit 50 receives the signal output from the comparator 40 and drives at least one of a plurality of main switches 60 which control the transmission of the signal. Each of the main switches 60 may be implemented by an N-channel metal-oxide semiconductor (NMOS) or a P-channel metal-oxide semiconductor (PMOS).

When the output voltage $V_O$ of the DC-DC converter decreases in an instant, a charge voltage of a capacitor of the stability compensation circuit 10, 20, or 20' is enabled to quickly reach the control voltage $V_C$ in the DC-DC converter 100, and therefore, the decrease of the output voltage $V_O$ can be quickly compensated for.

According to some embodiments of the present invention, a stability compensation circuit can quickly compensate for a difference between an output voltage of an integral capacitor and a control voltage by quickly charging the integral capacitor using an additional converter. In addition, when an instant decrease of an output voltage of a DC-DC converter exceeds a predetermined value, the integral capacitor can be quickly charged by reducing the magnitude of an effective integral resistor which charges the integral capacitor of the stability compensation circuit included in the DC-DC converter.

While the present invention has been particularly shown and described with reference to exemplary embodiments thereof, it will be understood by those of ordinary skill in the art that various changes in forms and details may be made therein without departing from the spirit and scope of the present invention as defined by the following claims.

What is claimed is:

1. A stability compensation circuit comprising:
a first converter configured to generate a first current corresponding to a voltage difference between an input voltage and a reference voltage;
a second converter configured to generate a second current corresponding to the voltage difference when the voltage difference exceeds a predetermined value; and
a charging circuit configured to receive the first current generated from the first converter and the second current generated from the second converter and increase an internal charge voltage,
wherein the charging circuit comprises a resistor connected between an output terminal of the first converter and an output terminal of the second converter and a capacitor connected between the output terminal of the second converter and a reference node.

2. A stability compensation circuit comprising:
a first converter configured to output a current corresponding to a voltage difference between an input voltage and a reference voltage;
an integration circuit configured to output an integration voltage based on the voltage difference; and
a sensing circuit coupled between the output of the integration circuit and the output of the first converter, the sensing circuit configured to sense a voltage difference between an output voltage of the integration circuit and an output voltage of the first converter, generate a control signal for controlling the voltage difference between the output voltage of the integration circuit and the output voltage of the first converter, and output the control signal to the integration circuit.

3. The stability compensation circuit of claim 2, further comprising a second converter configured to generate a current corresponding to a voltage difference between the output voltage of the integration circuit and the reference voltage.

4. The stability compensation circuit of claim 2, wherein the integration circuit comprises:
an integrator configured to generate the output voltage of the integration circuit; and
a resistance circuit configured to control current supplied to the integrator by controlling a resistance value in response to the control signal.

5. The stability compensation circuit of claim 4, wherein the integration circuit further comprises a switch which is turned on or off in response to the control signal output from the sensing circuit and controls the resistance value by turning on or off the switch in response to the control signal.

6. The stability compensation circuit of claim 2, wherein the sensing circuit comprises:
a sense resistor configured to measure the voltage difference between the output voltage of the integration circuit and the output voltage of the first converter; and
a comparator configured to compare the voltage difference measured by the sense resistor with a predetermined value and output the control signal based on a result of the comparison.

7. The stability compensation circuit of claim 6, wherein the comparator outputs the control signal when the voltage difference measured by the sense resistor exceeds the predetermined value.

8. A DC-DC converter comprising:
a ramp generator configured to output a ramp signal;
a stability compensation circuit configured to receive at least part of an output voltage of the DC-DC converter as a feedback voltage and perform stability compensation based on the feedback voltage and a reference voltage;
a comparator configured to compare a control voltage of the stability compensation circuit with the ramp signal output from the ramp generator, determine a pulse width based on a result of the comparison, and output a signal having the pulse width; and
a main switch operating circuit configured to receive the signal from the comparator and drive at least one switch among a plurality of main switches which control transmission of the signal,
wherein the stability compensation circuit comprises:
a first converter configured to generate a first current corresponding to a voltage difference between the feedback voltage and the reference voltage;
a second converter configured to generate a second current corresponding to the voltage difference when the voltage difference exceeds a predetermined value; and
a charging circuit configured to receive the first current generated from the first converter and the second current generated from the second converter and increase an internal charge voltage,
wherein the charging circuit comprises a resistor connected between an output terminal of the first converter and an output terminal of the second converter and a capacitor connected between the output terminal of the second converter and a reference node.

9. A DC-DC converter comprising:
a ramp generator configured to output a ramp signal;
a stability compensation circuit configured to receive at least part of an output voltage of the DC-DC converter as a feedback voltage and perform stability compensation based on the feedback voltage and a reference voltage;
a comparator configured to compare a control voltage of the stability compensation circuit with the ramp signal output from the ramp generator, determine a pulse width based on a result of the comparison, and output a signal having the pulse width; and
a main switch operating circuit configured to receive the signal from the comparator and drive at least one switch among a plurality of main switches which control transmission of the signal,
wherein the stability compensation circuit comprises:
a converter configured to output a current corresponding to a voltage difference between the feedback voltage and the reference voltage;
an integration circuit configured to output an integration voltage based on the voltage difference; and
a sensing circuit coupled between the output of the integration circuit and the output of the converter, the sensing circuit configured to sense a voltage difference between an output voltage of the integration circuit and an output voltage of the converter, generate a control signal for controlling the voltage difference between the output voltage of the integration circuit and the output voltage of the converter, and output the control signal to the integration circuit.

* * * * *